INVENTOR
Warren H. Bliss
BY Paul J. Mitchell
ATTORNEY

July 13, 1954 W. H. BLISS 2,683,768

MULTIPLEXING SYSTEM SYNCHRONIZATION

Filed Feb. 1, 1950 3 Sheets-Sheet 2

INVENTOR
Warren H. Bliss
BY
[signature]
ATTORNEY

MULTIPLEXING SYSTEM SYNCHRONIZATION

Filed Feb. 1, 1950 3 Sheets-Sheet 3

INVENTOR
Warren H. Bliss
BY
[signature]
ATTORNEY

Patented July 13, 1954 2,683,768

UNITED STATES PATENT OFFICE 2,683,768

MULTIPLEXING SYSTEM SYNCHRONIZATION

Warren H. Bliss, Princeton, N. J., assignor to Radio Corporation of America, a corporation of Delaware Application February 1, 1950, Serial No. 141,699

16 Claims. (Cl. 178—5.2)

Figure 1:
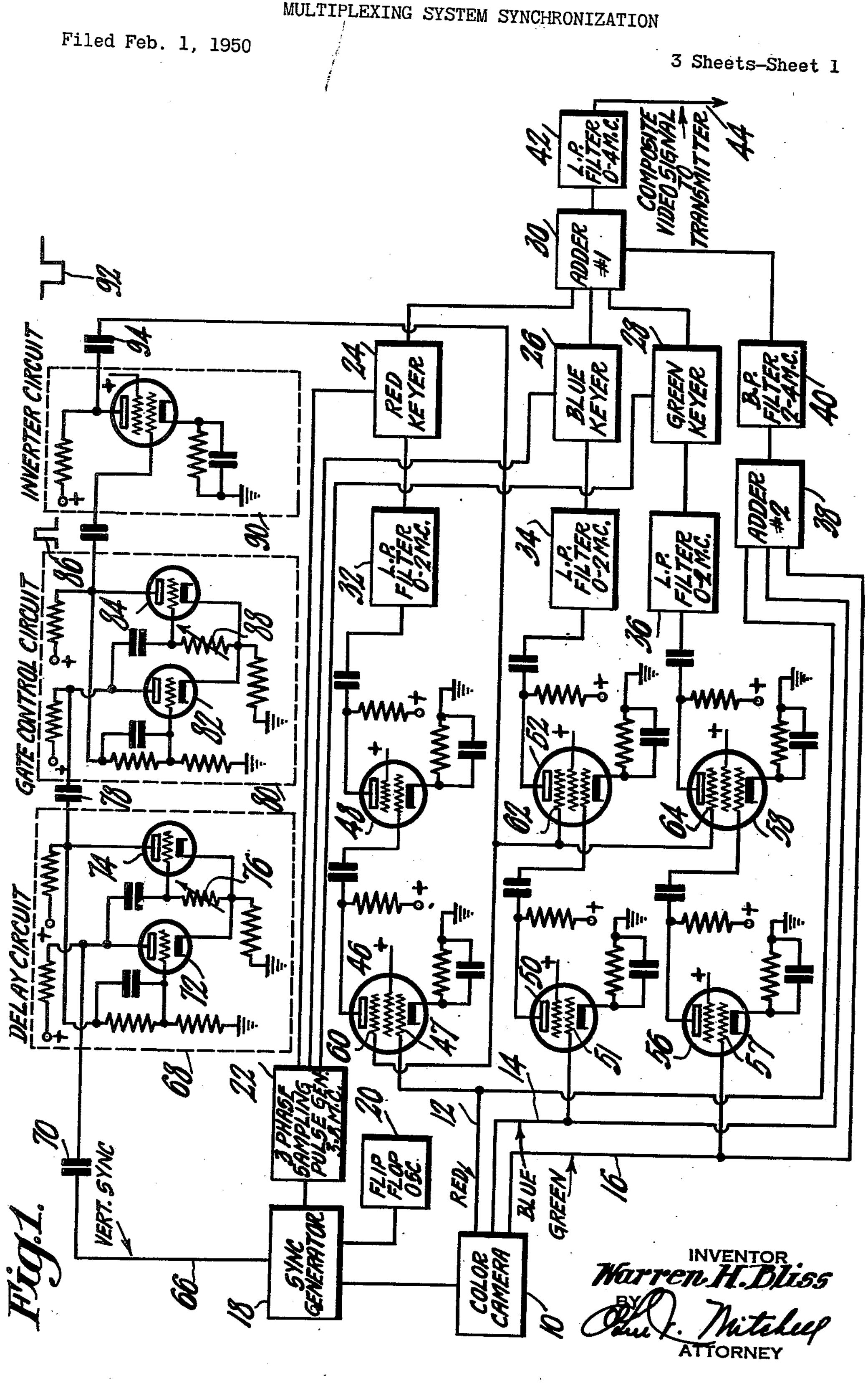

The present invention relates to time multiplex signal transmission and reception methods and apparatus and more particularly, although not necessarily exclusively, to improvements in time multiplexing methods and arrangements for transmitting and receiving color television signals.

More directly, the present invention deals with an improved synchronizing method and arrangement for use in time multiplexed color television transmission and receiving systems in which it is required to maintain a high degree of synchronous precision between the time multiplex signal sampling at the transmitter and the time multiplex signal distribution at the receiver.

Time division signal multiplexing systems for reducing required signal band width for communications systems are well known in the electrical art. At the transmitter terminal of such a time multiplex system, there is usually provided some means for sequentially sampling a plurality of separate signal intelligence channels to produce a composite signal comprising a series of grouped pulses, the amplitude variations of any one pulse of a given group corresponding to signal intelligence derived from a respective signal intelligence channel. At the receiving terminal of the multiplex transmission system there is supplied the counterpart of the signal sampling arrangement at the transmitter. This takes the form of a signal distributing arrangement which receives the series of pulses produced at the transmitter and distributes these pulses to a plurality of receiver signal channels corresponding in number to the signal intelligence channels of the transmitter. It can, therefore, be seen that the successful operation of the transmission and reception system will depend greatly upon the obtaining of exact isochronism between the transmitter signal sampling mechanism and the receiver signal distributing mechanism, for if the transmitter and receiver are not in synchronism in this respect, considerable cross talk in the receiver channels will result.

More particularly in the time division multiplex system for transmitting and receiving color television images, there are generally provided at the transmitter three separate component color channels whose outputs are sequentially sampled at a frequency of several megacycles or more. The output of the sampling mechanism is then applied to a radio transmitter for transmission along with the necessary synchronizing and blanking pulses for reproducing the color television image at a remote location. The receiver for such a composite color television signal, of course, includes three separate color channels having their inputs connected with the output of a signal distributing mechanism. The input of the signal distributing system is suitably supplied with the received composite signal so that the signal is periodically dissected and its component pulses properly distributed to the receiver color channels. As above pointed out, precise isochronism must be maintained between the receiver signal distributing mechanism and the transmitter sampling mechanism so that, for example, in a red, green, blue color system, the receiver distributor supplies the receiver red channel with signal information only during the interval in which the transmitter sampler is sampling the transmitter red channel.

A more thorough understanding of the importance of multiplexing isochronism between transmitter and receiver terminals of a dot sequential type color television system may be had by reference to two bulletins of Radio Corporation of America, RCA Laboratories Division, respectively entitled "Synchronization for Color Dot Interlace in the RCA Color Television System" and "A 15 x 20″ Projection Receiver for the RCA Color Television System," copies of which are filed with the Federal Communications Commission in Washington, D. C.

Accordingly, it is an object of the present invention to provide an improved synchronizing method and arrangement for maintaining a high degree of isochronism between a time multiplexing sampling mechanism and a time multiplexing signal distribution mechanism.

A further object of the present invention is to provide an improved synchronizing method and arrangement for establishing and maintaining isochronism between the time multiplexing equipments residing in present-day dot-sequential color television transmission and reception equipments.

A further object of the present invention resides in the provision of a new and useful automatic frequency control arrangement for time multiplex signal distributing equipment which permits the timing of signal distribution to be altered in accordance with the character of information distributed by the distributing system.

A still further object of the present invention is involved in an improved method and system for transmitting time multiplexed signal information representing a plurality of signal channels such that a component of the transmitted signal is indicative of the sequence and timing of signal channel sampling.

Another object of the present invention is to provide an improved color television transmission and reception method and system of the dot-sequential variety which is characterized by a very high degree of precision in color reproduction.

It is a still further object of the invention to provide an improvement in the overall synchronization system of the color television arrangement shown and described in the above-referenced RCA Laboratory bulletins entitled "Synchronization of Color Dot Interlace in the RCA Color Television System" and "A 15 x 20" Projection Receiver for the RCA Color Television System."

In order to realize the above objects and features of advantage, the present invention in its more general form as applied to a time multiplex signal transmitting and receiving system contemplates the use of a signalling system at the transmitting terminal which will periodically establish the output of the various sampled or commutated signal channels, at respective predetermined levels so as to define, at the output of the transmitter, a code waveform of predetermined character. At the receiving terminal of the multiplex system, the outputs of at least two of the receiver signal channels to which signals are fed by the receiver signal distributing system, are compared in amplitude during the transmission of the code waveform to develop a control signal which is indicative of the timing correction necessary in the phase of the receiver sampler to exact isochronism between it and the transmitter signal sampling system. This control signal at the receiver is then applied to a controlling circuit which will appropriately alter the timing of the receiver signal distributing system to make any needed correction.

More specifically, the present invention as applied to a three color dot-sequential color television transmission and reception system contemplates the periodic transmission of a single television image line or portion thereof, representing a single hue or color, whereby to define at the output of the color television transmitter a code waveform of predetermined character for the duration of the line transmission. In general, this single color line or code line is restricted in its occurrence to the top or bottom of each television field and is, therefore, synchronously related to the vertical sync pulse of the color television transmitter. The color television receiver is then provided with a signal sampling mechanism which concomitantly samples the output of two of the receiver color channels for an interval corresponding to the duration of the single color code line. The outputs of the two channels during the sampled interval are then compared to develop a control signal which, in turn, is then applied to a control circuit which establishes the proper frequency and phase of the color receiver time multiplex signal distributing system. The sense of this correction is established so as to maintain precision isochronism between the transmitter time multiplex sampling system and the receiver time multiplex signal distributing system.

Figure 2:
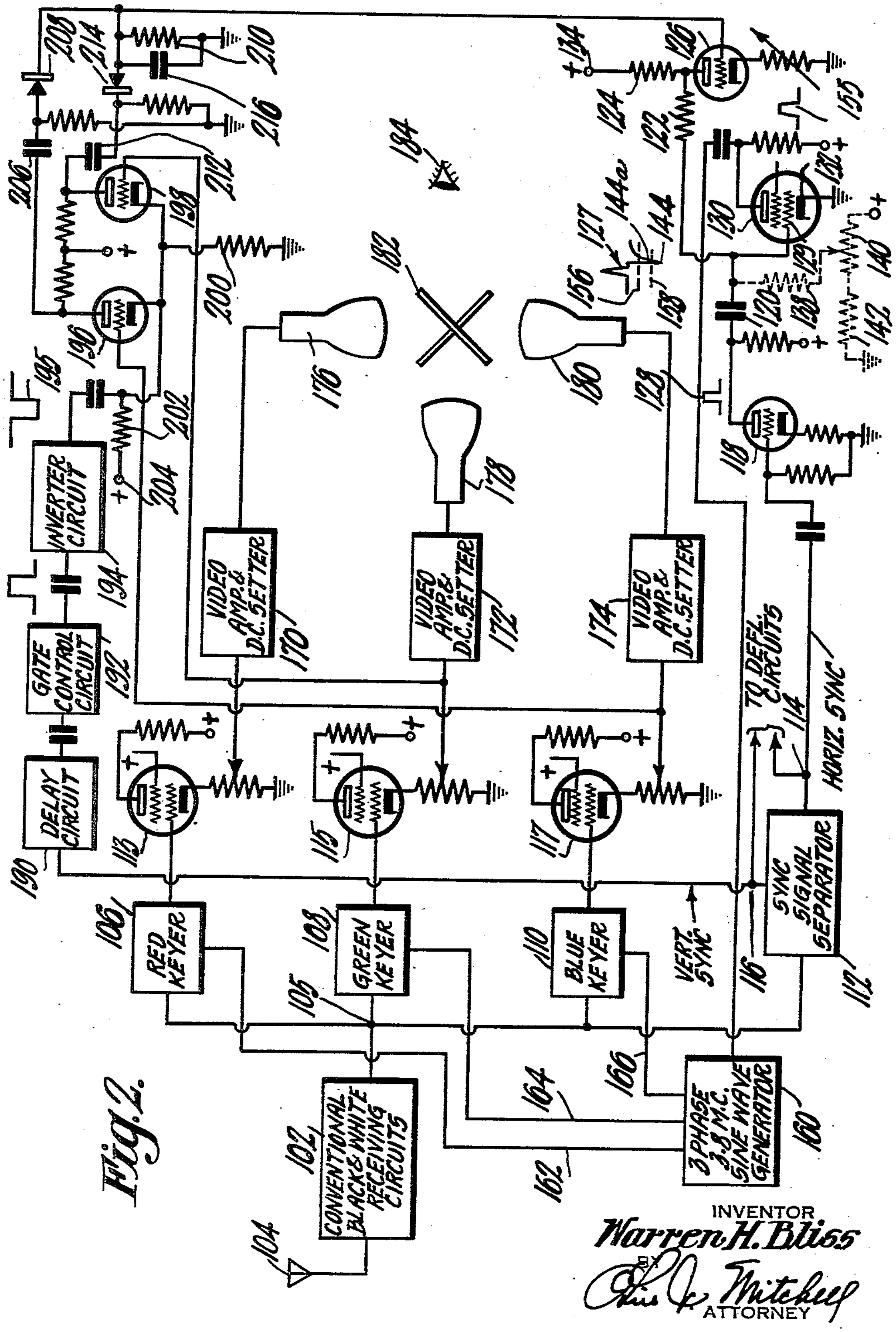
Figure 3:
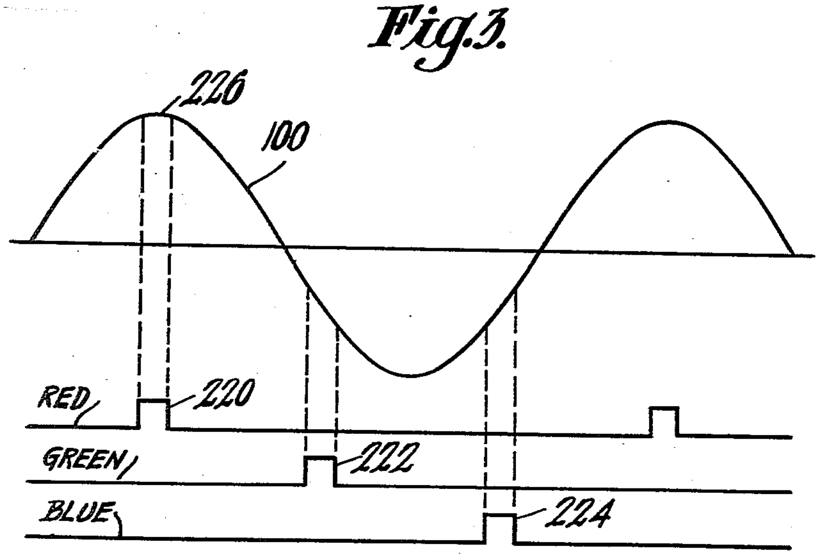
Figure 4:
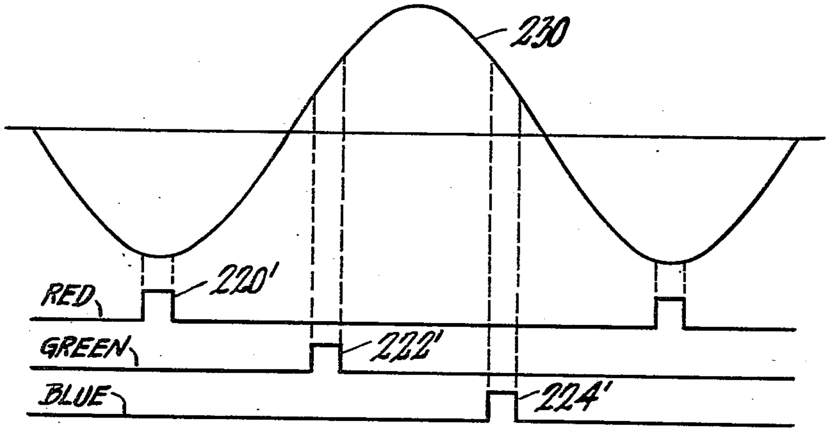

A more complete understanding of the present invention, as well as other objects and features of advantage in addition to those set forth hereinabove, may be obtained through the reading of the following description, especially when taken in connection with the accompanying drawings in which, Figure 1 illustrates, by a combination schematic and block diagram, one form of the present invention finding particular utility in a color television dot-sequential type transmission system;

Figure 2 illustrates by a combination schematic and block representation, a form of the present invention useful in connection with dot sequential color television receivers of a type particularly adapted to receive the signal produced by the transmitting arrangement of Figure 1;

Figure 3 indicates a signal waveform and sampling schedule typical of the present invention; and Figure 4 illustrates another signal waveform and sampling schedule characteristic of the present invention.

Turning now to Figure 1, the general arrangement here shown, with the exception of the refinements provided by the present invention hereinafter to be described, represents a color television transmission system of a type described in full detail in the above-referenced RCA bulletin "Synchronization for Color Dot Interlace in the RCA Color Television System" and appears in Figure 5 thereof. It essentially comprises a color camera 10 having red, blue and green output channels 12, 14 and 16 respectively. The color camera 10 is synchronized in its operation by a master sync generator 18 which in conjunction with a flip-flop oscillator 20 operates to time the three-phase sampling pulse generator 22. The sampling pulse generator 22, of course, provides successive keying pulses separated by 120 degrees for the operation of the red, blue and green keyer circuits 24, 26 and 28, whose outputs are applied for combining in the added circuit No. 1 at 30 as described in the above laboratory bulletin "Synchronization for Color Dot Interlace in the RCA Color Television System." The red, blue and green keyer circuits are supplied with red, blue and green color channel intelligence signals as provided by the camera 10. This is, of course, accomplished through the low pass filters 32, 34 and 36 intercalated in each of the circuits extending from the output of the color camera channels and the input of the respective color channel keyer. To obtain higher definition effects in the transmitted picture, the high frequency components of the red, blue and green channels at the output of the color camera 10 are combined in adder circuit No. 2 at 38 whose output is filtered by the band pass filter 40 and also applied to the adder circuit No. 1 at 30. The output of the adder circuit 30 is, of course, communicated by a low pass filter 42 to a line 44 indicated for carrying the composite video signal to a radio transmitter. The elements thus far described operate in exactly the same manner as described in the above-referenced bulletin "Synchronization for Color Dot Interlace in the RCA Color Television System."

According to the present invention, however, there are placed in the signal channels existing between the output connections 12, 14 and 16 of the color camera 10 and the input of the corresponding low pass filters 32, 34 and 36, signal modifying circuits comprising discharge tubes 46, 48, 50, 52, 56 and 58. It will be recognized from the circuitry surrounding discharge tubes 48, 50 and 56 that they act as merely conventional signal amplifiers. Discharge tubes 46, 52 and 58 are also arranged as conventional amplifiers of the signal-mixing variety such that signals may be added to the respective color channels via the control electrodes 60, 62 and 64 of these tubes.

In further accord with the present invention, the vertical sync output of the sync generator 18 appearing at terminal 66 thereof, is applied to the input of a delay circuit 68 via capacitor 70. The delay circuit 68, comprising discharge tubes 72 and 74, is shown, for example, as being of the typical multivibrator variety having a delay period adjustable by the variable resistor 76. The output of the delay circuit 68 is then applied via capacitor 78 to another multivibrator circuit 80, comprising discharge tubes 82 and 84. This multivibrator circuit 80 is designated as a gate control circuit and is adapted to develop a gating pulse 86 whose width is rendered a function of the setting of the variable resistance 88 of the multivibrator circuit 80. This circuit action is well known to those skilled in the art and it is not thought to need detailed description. Suffice it to say that in one of the preferred forms of operating the present invention, the width of the pulse 86 is, by adjustment of resistor 88, made substantially equal to the period of one television line interval. The inverter circuit 90 receives the gate control pulse 86 and inverts its polarity, as indicated by the waveform 92, for subsequent application via coupling capacitor 94 to the mixing grids 60, 62 and 64 of the discharge tubes 46, 52 and 58 previously described.

Considering now the operation of the present invention as applied to the arrangement of Figure 1, it shall be assumed that the red, blue and green color channels 12, 14 and 16 are applied to the control electrodes 47, 51 and 57 of the discharge tubes 46, 50 and 56 such that a negative swing of these control electrodes will represent an increase in the brightness of the respective channel color component. Thus, a decrease in the plate current of discharge tube 46 will be evident during intervals in which the red component of the transmitted picture increases. Since the discharge tubes 46, 50 and 56 act as conventional amplifiers, the phase of the signal applied to the tubes 48, 52 and 58 will, of course, be reversed so that a decrease of the plate current of tubes 48, 52 and 58 will represent a decrease in the color component represented by the respective color channel. As shown and hereinabove described, the actuating pulse or control pulse 92 appearing at the output of the inverter circuit 90 is applied to the control electrodes 60, 62 and 64 of the discharge tubes 46, 52 and 58 and with the assumed signal polarity just described, it will be seen that the negative-going pulse 92 acts in effect to increase the brightness of the red color component and decrease the brightness of the blue and green color components. In one mode of the present invention, the pulse 92 is made of sufficient amplitude to effectively saturate the red channel by driving the tube 46 to cut off while virtually disabling the blue and green channels by driving the tubes 52 and 58 to cut off. Hence, for the duration of the actuating pulse 92, the video transmitter, associated with the exemplary embodiment of Fig. 1, will transmit only red information and the output of the adder circuit 30 will then comprise a sine wave 100 substantially as shown in Figure 3. If, as described above, the actuating pulse 92 is made of a duration substantially equal to one line interval, the effect of the pulse 92 may be viewed as causing the transmitter to transmit a single red line.

As pointed out above, it is generally desirable, although not necessarily required, that this single color line produced by the actuating pulse 92 be timed to occur at the top or bottom of a vertical picture field. This removes the likelihood of the single color line being visible in the picture raster. To achieve this timing, the delay multivibrator circuit 68, adapted for synchronization by the trailing edge of the vertical sync pulse derived from the sync separator 18, may be adjusted by means of resistor 76 to provide a delay of sufficient duration that the gate control circuit 80 will initiate the front edge of the gate control pulse 86 at the beginning of the first scanning line following the conventional vertical blanking period. Since the discharge tubes 46, 52 and 58 are driven to cut off by the actuating pulse 92, it can be seen that the intensity of the red line thus transmitted will be virtually independent of other signal information delivered by the color camera 10. The red signal thus developed may be thought of as a code signal and in conjunction with the receiver apparatus about to be described, may be ingeniously utilized to establish virtually perfect isochronism of the color television receiver signal distributing system.

A receiver arrangement embodying the present invention is shown by way of illustration in Fig. 2. The overall arrangement of the receiver layout in Fig. 2 is, for the purpose of lending clarity and ease of understanding to the operation of the present invention, made substantially the same as Fig. 1 of the above-referenced RCA Laboratory bulletin "A 15 by 20" Projection Receiver for the RCA Color Television System" with, however, the addition of some schematic representations taken from Fig. 9 of the same bulletin. Although sufficiently described in the related text appearing in the bulletin, the operation of the receiver arrangement in Fig. 2, not for the present considering the novel aspects of the present invention, is briefly as follows:

A composite multiplexed color television signal produced by the transmitter arrangement of Fig. 1 is received by conventional black and white receiving circuit 102 via the antenna 104. The composite demodulated signal appearing at the output terminal 105 of the receiver 102 is then applied to the input of a signal distributing circuit comprising keyer units 106, 108 and 110. The synchronizing signal component of the received composite signal is, of course, separated by the synchronizing signal separator circuit 112 and divided into horizontal and vertical synchronizing signals made respectively available to the separator output terminals 114 and 116. As indicated, these synchronizing signals are utilized in a conventional manner for control of the receiver deflection circuits, as well as the synchronization of the receiver signal distributing system.

For this latter purpose of controlling the received multiplexed signal distributing system, the horizontal synchronizing pulses appearing at terminal 114 are amplified by the discharge tube 118 and applied to a differentiating circuit comprising capacitor 120 and resistance 122 taken, of course, in combination with the plate loading resistance 124 and plate resistance of the discharge tube 126. As described in the above-referenced bulletin "A 15 x 20" Projection Receiver for the RCA Color Television System," the differentiated form 127 of the horizontal synchronizing signal 128 is applied to the control electrode 129 of discharge tube 130, which control electrode is rendered positive relative to the cathode 132 by merit of its connection through resistance 122 to a positive power supply potential 134.

To make the correlation of the present system in Fig. 2 with the Fig. 9 of the above-referenced "A 15 x 20'' Projection Receiver for the RCA Color Television System" bulletin more clear, it is noted that the discharge tube 130 of the present Fig. 2 generally corresponds to the discharge tube V4 of the bulletin's Fig. 9. Dotted resistance elements 138, 140 and 142 illustrate the connections of the control electrode 129 in the manner indicated in the above-referenced Fig. 9 of the bulletin.

With the control electrode 129 positive with respect to the cathode 132 virtually only the negative-going peak 144 of the differentiated horizontal sync pulse 128 will be passed by the tube 130. In practice, the amplitude of the differentiated sync pulse of the peak 144 is of sufficient amplitude to swing the tube 130 well beyond cut-off so that a control pulse of approximately the form shown at 155 will appear at the output of the discharge tube 130. The width of the control pulse 155 appearing at the output of the discharge tube 130 may be varied by controlling the bias on the control electrode 129. This action obtains due to the sloping nature of the back edge 144a of the differentiated sync pulse peak 144. The dotted line 156 indicates the point at which the grid 129 begins to influence the plate current of the discharge tube 130 while the dotted line level 158 indicates the signal level at which the grid 129 establishes plate current cut off of the tube 130. Thus, by varying the grid bias on the discharge tube 130, the amount of differentiated sync pulse peak 144, embraced between the levels 156 and 158, may be altered to provide a small variation in the width of the control pulse 155.

As further described in the above RCA Laboratory bulletin "A 15 x 20'' Projection Receiver for the RCA Color Television System," the actuating pulse 155 is then applied to a three-phase 3.8 mc. sine wave generator 160 for synchronization thereof. The sine wave generator synchronizing system is such that the generator 160 is disabled for the duration of the actuating pulse 155. The three-phase output of the generator 160 is then, via circuit paths 162, 164 and 166, applied for control of the keyer circuits 106, 108 and 110 so that the red, green and blue channels are keyed on during successive discrete signal distributing intervals. Discharge tube amplifiers 113, 115 and 117 corresponding to tubes V15, V23 and V31 of Fig. 9 in the above-referenced RCA Lab. Bulletin article are respectively fed by the outputs of the red, green and blue color keyers so as to deliver red, green and blue color channel information to the video amplifiers 170, 172 and 174. As indicated, the output of the video amplifiers 170, 172 and 174 are respectively fed to color reproducing projection kinescopes 176, 178 and 180 whose images are optically combined by the dichroic mirrors 182 for viewing by the eye at 184.

From the receiver arrangement thus far described, it will be seen that the phase of the 3.8 mc. sine wave generator 160 is of prime importance in preventing wrong color information from being distributed to the color channels 170, 172 and 174. The sequence of keying the circuits 106, 108 and 110 must not only agree in frequency to the keyer circuits 24, 26 and 28 of the transmitter in Fig. 1 but must occur in exactly the same sequence and at exactly the same time as the transmitter keyers. The correct phasing of the receiver keyers 106, 108 and 110, as described in the above-referenced bulletin was accomplished by varying the width of the actuating pulse 155 in accordance with the manual potentiometer 140 shown by dotted lines. However, it is easily understood that due to ordinary circuit variations over long operating intervals that frequent adjustment of the width of the actuating pulse 155 would generally have to be made in order to maintain the exact isochronism between the transmitter sampling mechanism of Fig. 1 and the receiver signal distributing system of Fig. 2.

According to the present invention, this phase adjustment is automatically accomplished by means of the delay circuit 190, gate control circuit 192, and inverter circuit 194 operating to feed a keying pulse 195 to a two-channel gate circuit comprising discharge tubes 196 and 198. The circuits 190, 192 and 194 of Fig. 2 may, for example, be identical to the circuits 68, 80 and 90 of Fig. 1 and may be adjusted to operate in the same manner. The delay circuit 190 is actuated by the vertical sync pulse appearing at the output terminal 116 of the synchronizing signal separator 112. Thus, with the circuits 190, 192 and 194 adjusted in accordance with the corresponding arrangement in Fig. 1, the actuating pulse 195 applied to the common cathode resistance 200 of the sampler discharge tubes 196 and 198 in Fig. 2 will be identical to the actuating pulse 92 of Fig. 1. It will be noted that the common cathode resistance 200 is through resistance 202 connected with a positive source of potential having a terminal at 204. It is with such an arrangement that the discharge tubes 196 and 198 may be statically biased at cut off to become conductive only for the duration of the control pulse 195. The grids of the sampler discharge tubes 196 and 198 are respectively connected to the output of the blue signal amplifier 117 and the green signal amplifier 115. Blue signal pulses will then appear at the output of discharge tube 196 during conduction thereof and will be coupled via capacitor 206 to the diode 208 having a load resistance 210. The polarity with which the diode 208 is connected is such that upon passing current, the upper terminal of resistance 210 will become positive with respect to ground. The green signal pulses appearing at the output of the discharge tube 198 are on the other hand coupled via capacitor 212 to diode 214 connected to pass current through resistance 210 in the opposite direction to the diode 208. Thus, current passing through diode 214 will tend to make the upper terminal of the resistance 210 negative. Capacitor 216 in shunt with resistance 210 forms a time constant network of sufficient duration so that successive pulses passed by the diodes 208 and 214 from the respective blue and green channels may be subtractively combined.

The manner in which the discharge tubes 196 and 198, taken in combination with the diodes 208 and 214, act to detect the proper phase of receiver signal distribution is as follows:

Referring to Fig. 3, there is illustrated the sine wave 100 demodulated by the receiver 102 during the transmission of the single red line by the transmitter of Fig. 1. The intervals during which the red, green and blue keyers 106, 108 and 110 are successively turned "on" by the three phase sine wave generator are illustrated at 220, 222, and 224. As before pointed out, when proper synchronization between the receiver distributor circuit and transmitter is obtained, the red distribution interval 220 of the keyer 106 will occur during exactly the same interval in which the transmitter of Fig. 1 is sampling the red channel. Since during the reception of the single color code line, the red channel of Fig. 1 is turned on to its fullest extent, it follows that the crest 226 of the sine wave 100 should occur during the receiver red distribution interval 220. This relationship is shown in Fig. 3. Thus, it can be seen that under proper synchronizing conditions, the pulses passed by the green and blue keyer circuits 108 and 110 respectively sampling the sine wave 100 during intervals 222 and 224 will be of equal amplitude and hence will effectively cancel their storage effects on capacitor 216. This means that, under conditions of isochronism between receiver and transmitter, the stored effects of the green and blue pulses across the capacitor 216 will cancel and result in a zero average potential across the capacitor 216. Should, however, the receiver sine wave generator 160 advance in phase relative to the received sine wave 100, it will be evident that the blue sample taken during interval 224 will be of greater amplitude than the green sample taken during interval 222 thereby unbalancing the voltage across capacitor 216, causing the upper terminal thereof to become positive with respect to ground. This positive increase in voltage will increase the plate current of discharge tube 126 operated as a DC amplifier and cause the grid 129 of amplifier tube 130 to become slightly more negative with respect to ground. This will, in turn, cause the control pulse 155 to become of less duration and hence correct the timing of the sine wave generator 160 in the direction of proper isochronism of the receiver signal distribution action. On the other hand, should the local receiver 3.8 mc. oscillator 160 be retarded in phase, a negative voltage will be produced across the resistor 210 and the resulting increase in the width of pulse 155 will cause suitable correction in the sine wave oscillator to produce isochronism.

From the above, it may be seen that the present invention provides a novel automatic synchronizing system for time multiplexed signal distribution systems and is especially applicable to such systems as are used in color television receivers.

It is well to note, however, that the present invention in its application to color television receivers of the type described herein is in no way limited to the particular color or pulse combination employed during the coded line. Furthermore, the duration during which a predetermined amplitude combination of pulses is transmitted by the color transmitter may be more or less than a single image line.

By way of example of another useful pulse and code line combination, there is illustrated in Fig. 4 the operation of the present invention in connection with a cyan single color line comprising equal amounts of blue and green. To obtain the transmission of a cyan color line, it will be necessary merely to reverse the polarity of the actuating pulse 92 of the transmitter in Fig. 1 in its effect on tubes 46, 52, and 58 so that throughout its duration the red channel will be effectively disabled while the blue and green channels will be given equal increments in signal output. The transmitted video signal will be again sine wave in nature as illustrated by the curve 230 in Figure 4. Under such conditions, the red sampling interval 220′ will occur during the trough of the sine wave 230 and the green and blue distribution intervals 222′ and 224′ of the receiver will produce at the respective output of the sample tubes 196 and 198 pulses of equal amplitude as in the case of the arrangement of Figure 3. However, it will be seen that the sense of correction voltage developed across capacitor 216 will be exactly opposite from that produced by the arrangement previously described. Here in Figure 4, an advance in the phase of the local oscillator 160 will cause the blue sampled pulse appearing at the output of discharge tube 116 to decrease instead of increase, thus making the net voltage shift of the upper terminal of the capacitor 216 one in the negative direction instead of the positive direction. To remedy this, it is merely necessary to reverse the polarity in which the rectifier units 208 and 214 are connected. Thus, when operating in accordance with the arrangement depicted in Fig. 4, diode 208 instead of passing current through the resistor 210 in a direction so as to make its upper terminal positive will be reversed in its connection so that an increase in current through the diode 208 will cause a negative potential to be developed at the upper end of the resistor.

Other code color lines and pulse combinations useful in the practice of the present invention will, of course, occur to those skilled in the art after having benefited from the above description. Furthermore, the exemplary arrangements of the delay circuit, gate control circuit, and inverter circuit shown in Figures 1 and 2 may be modified many ways to produce the desired functions. For example, the inverter circuit 90 of Fig. 1, in the case of the alternative arrangement described in connection with Fig. 4, may be entirely omitted and the pulse 86 used directly for keying of the tubes 60, 62, and 64. Moreover, the precise manner in which the output signals from the sampled receiver channels during the period of single color line transmission are compared to produce a control voltage may be varied to suit individual tastes and conveniences. Correspondingly, the exact mechanism by which the phase control voltage thereby developed is employed to shift the phase of the distributing mechanism control oscillator is of no particular importance, the arrangement shown in the receiver of Fig. 2 being merely exemplary of a preferred way of accomplishing this end.

Having thus described my invention, what I claim is:

1. In a time division multiplexed signal transmission system employing a plurality of signal intelligence sources designated for multiplexed transmission over a single signal channel to a signal distribution utilization terminal, a synchronizing signalling arrangement comprising in combination, an electrical signal sampling mechanism having a plurality of input terminals and at least one output terminal, said sampling mechanism being adapted to sequentially and separately channel each of said input terminals to said output terminal at a periodic rate defined by a control signal to form an output terminal signal comprising successive sampled intervals, a source of sampling control signal coupled with said sampling mechanism for establishing the sampling rate thereof at a predetermined value, coupling means connected between the output of each of said signal intelligence sources and a respectively different sampling mechanism input terminal, means for generating an actuating signal having a frequency substantially less than said sampling control signal but fixedly timed relative thereto, signal interrupting means connected in series with at least one of said coupling means such as to conditionally suspend intelligence signal influence on the corresponding sampling mechanism input terminal, and signal gating means connected to said signal interrupting means for controlling the operation of said signal interrupting means in accordance with said actuating signal, said signal interrupting means polarized such that the output terminal signal of said sampling mechanism will be indicative of sampling mechanism timing during the actuation of said interrupting means by said actuating signal.

2. Apparatus according to claim 1 wherein means are included for causing said interrupting means to be responsive to said actuating signal to interrupt the intelligence signal for the duration of the waveform characteristic of said actuating signal, and wherein said actuating signal waveform characteristic duration is made to substantially correspond to an integral number of sampling rate periods.

3. In a time division multiplexed signal transmission system employing a plurality of signal intelligence sources designated for multiplexed transmission over a single signal channel to a signal distribution utilization terminal, a synchronizing signalling arrangement comprising in combination, an electrical signal sampling mechanism having a plurality of input terminals and at least one output terminal, said sampling mechanism being adapted to sequentially and separately channel each of said input terminals to said output terminal at a periodic rate defined by a control signal to form an output terminal signal comprising successive sampled intervals, a source of sampling control signal coupled with said sampling mechanism for establishing the sampling rate thereof at a predetermined value, coupling means connected between the output of each of said signal intelligence sources and a respectively different sampling mechanism input terminal, means for generating an actuating signal having a frequency substantially less than said sampling control signal but fixedly timed relative thereto, signal adding means connected in series with at least one of said coupling means, electronic control means for applying said actuating signal to said signal adding means in such a polarity that the output terminal signal of said sampling mechanism will be indicative of sampling mechanism timing during the actuation of said interrupting means by said actuating signal.

4. Apparatus according to claim 3 wherein means are included for causing said actuating signal waveform to be of a duration substantially equal to an integral number of sampling rate periods.

5. In a time division multiplexed signal transmission system employing a plurality of signal intelligence sources designated for multiplexed transmission over a single signal channel to a signal distribution utilization terminal, a synchronizing signalling arrangement comprising in combination, an electrical signal sampling mechanism having a plurality of input terminals and at least one output terminal, said sampling mechanism being adapted to sequentially and separately channel each of said input terminals to said output terminal at a periodic rate defined by a control signal to form an output terminal signal comprising successive sampled intervals, a source of sampling control signal coupled with said sampling mechanism for establishing the sampling rate thereof at a predetermined value, coupling means connected between the output of each of said signal intelligence sources and a respectively different sampling mechanism input terminal, means for generating an actuating signal having a frequency substantially less than said sampling control signal but fixedly timed relative thereto, signal interrupting means connected in series with at least one of said coupling means such as to conditionally suspend intelligence signal influence on the corresponding sampling mechanism input terminal, means for timing said signal interrupting means in accordance with said actuating signal, signal adding means connected in series with at least one of those coupling means not having a signal interrupting means connected in series therewith, means for applying said actuating signal at a constant amplitude to said signal adding means whereby the interval defined by the addition of actuating signal information during one sampling interval and the suspension of intelligence signal during another sampling interval is indicative of sampling mechanism timing.

6. Apparatus according to claim 5 wherein each of said intelligence signal sources comprises a component color channel of a dot-sequential color television system having a predetermined line duration and field timing frequency, wherein said interrupting means is responsive to said actuating signal to interrupt the intelligence signal for the duration of the waveform characteristic of said actuating signal, and wherein said actuating signal frequency is equal to said television field rate and the active portion of the waveform thereof has a duration substantially equal to the duration of a television line.

7. In a signal receiving system adapted to receive and time distribute a composite time division multiplexed signal comprising a synchronizing component and an intelligence component, said intelligence component comprising a series of grouped pulses, the individual pulses of each group representing samples of separate respectively commutated signal intelligence sources, certain samples of which have been modified in amplitude to represent the timing of said intelligence source commutation, the frequency of the synchronizing pulse component being fixedly related to the frequency of the intelligence source commutation, in combination, an electrical signal distributing system having at least one input terminal and a plurality of output terminals, said distributing system being adapted to sequentially and separately channel each of said output terminals to said input terminal at a periodic rate defined by a control signal, means for applying received composite signals to said signal distributing system input terminal, a source of control signal coupled with said signal distributing system for defining the distribution timing thereof, means to control the timing of said control signal source in accordance with a control voltage, means for concomitantly sampling the signal outputs appearing on at least two of the output terminals of said signal distribution system, the timing and duration of said concomitant sampling being in accordance with the timing and duration of a sampling control signal, means for segregating said composite signal synchronizing component and applying to said sampling means as a sampling control signal, means for comparing the amplitudes of successive signals alternately sampled by said sampling means to develop a control voltage indicative of continuously varying amplitude differential, and connections for applying said developed control voltage to said distributing system control signal control means in such electrical sense as to synchronize the timing of said signal distribution with commutation of said signal intelligence sources.

8. Apparatus according to claim 7 wherein each of the commutated intelligence sources represented by said composite signal pulses comprises a color channel of a dot sequential color television system having a predetermined vertical and horizontal synchronizing signal frequency, and wherein said composite signal synchronizing component comprises the vertical synchronizing signal of said color television system.

9. A time multiplexed color television transmission system comprising a plurality of color channels connected to the input of a means for successively sampling during sampling intervals of a predetermined duration and rate of recurrence, the output of each color channel to produce a series of output pulses, means to develop both vertical and horizontal synchronizing pulses whose different recurrence frequencies respectively define the durations of television image raster field and line intervals, means for generating a control pulse synchronously related to said vertical synchronizing pulses, said control pulse having a duration substantially greater than the interval between successive samplings of any given color channel, means intercalated in at least one color channel for mixing said control pulse in a signal increasing polarity with the color signal in said channel such that the output of said sampling mechanism will periodically evidence a sustained increase of pulse amplitudes corresponding to the sampling of said one color channel.

10. A time multiplexed color television transmission system comprising a plurality of color channels connected to means for successively sampling during sampling intervals of a predetermined duration and rate of recurrence, the output of each color channel to produce a series of output pulses, means to develop both vertical and horizontal synchronizing pulses whose different recurrence frequencies respectively define the durations of television image raster field and line intervals, means for generating a control pulse synchronously related to said vertical synchronizing pulses, said control pulse having a duration substantially greater than the interval between successive samplings of any given color channel, means intercalated in at least two color channels for mixing said control pulse in a signal decreasing polarity with the color signal in said channel, such that the output of said sampling mechanism will periodically evidence a sustained decrease of pulse amplitudes corresponding to the sampling of those color channels having mixed therewith said control pulse.

11. A time multiplexed color television transmission system comprising a plurality of color channels connected to the input of a mechanism for successively sampling during sampling intervals of a predetermined duration and rate of recurrence, the output of each color channel to produce a series of output pulses, means to develop both vertical and horizontal synchronizing pulses whose different recurrence frequencies respectively define the durations of television image raster field and line intervals, the combination of, means for generating a control pulse synchronously related to said vertical synchronizing pulses, said control pulse having a duration substantially greater than the interval between successive samplings of any given color channel, and separate means intercalated in each color channel for mixing a predetermined respective amplitude of said control pulse with the color signal in each of said channels such that the output of said sampling mechanism will periodically evidence sustained uniform variations in successive pulse amplitudes indicative of the sequence and timing of signal sampling.

12. A time multiplexed color television transmission system comprising a plurality of color channels connected to the input of means for successively sampling during sampling intervals of a predetermined duration and rate of recurrence, the output of each color channel to produce a series of output pulses, said television system including means to develop both vertical and horizontal synchronizing pulses whose different recurrence frequencies respectively define the durations of television image raster field and line intervals, means for conditionally concomitantly establishing the signal amplitude output of each color channel at a respective predetermined signal level, means for timing the actuation of said signal establishing means in synchronism with said vertical synchronizing pulse, and means for limiting the duration of the individual intervals throughout which said signal establishing means maintains effect upon being actuated to a period greater than the interval between successive samplings of any given color channel such that the output of said sampling mechanism will periodically evidence sustained uniform variations in successive pulse amplitudes indicative of the sequence and timing of signal sampling.

13. A color television receiver having a multiplex distributing apparatus, means to time distribute to a plurality of receiver color channels a composite color television signal comprising a synchronizing component and an intelligence component, the intelligence component in turn comprising a series of grouped pulses, the amplitude variations of each of the separate pulses of a given group nominally representing color information for a different color channel, a plurality of said pulse groups taken together defining information units periodically recurring members of which represent color channel information corresponding to but a single color, the recurrence frequency of said single color information units being synchronously related to said synchronizing component, an oscillator for generating a control signal coupled to said distributing apparatus so as to define the timing of signal distribution to said receiver color channels, means for generating an actuating pulse in accordance with said received synchronizing component, said actuating pulse having a duration greater than the interval between successive distributions to a given color channel, means for concomitantly sampling the outputs of at least two of said receiver color channels for the duration of said actuating pulse, signal amplitude comparing means connected with the output of said sampling means to develop an output voltage representative of the amplitude differential between successive pulses from said sampling means, and means for controlling the timing of said oscillator in accordance with said comparing means output voltage.

14. Apparatus according to claim 13 wherein means are included to cause said synchronizing component to which said actuating pulse is synchronously related correspond to the vertical synchronizing pulse of the color television system and wherein the duration of the actuating pulse is made substantially equal to one horizontal line interval of the color television system.

15. A color television receiver comprising means to receive a composite time multiplex television signal having a synchronizing component and color channel pulse component, a signal distributing apparatus having an input terminal and a plurality of output terminals to which said input terminal is periodically and individually coupled in accordance with a timing signal, a separate color channel connected with each distributing apparatus output terminal, a signal generator for developing a timing signal for said signal distributing apparatus, means for controlling the phase of said timing signal generator in accordance with an actuating signal, and means responsive to the output of at least two color channels for developing an actuating signal for said control means.

16. Apparatus according to claim 15 wherein said color channel output responsive means comprises a signal sampling device adapted to sample said color channel outputs at a frequency defined by said synchronizing component.

References Cited in the file of this patent

UNITED STATES PATENTS

| Number | Name | Date |
|---|---|---|
| 2,037,847 | Bown | Apr. 21, 1936 |
| 2,418,116 | Grieg | Apr. 1, 1947 |
| 2,465,371 | Grieg | Mar. 29, 1949 |
| 2,521,010 | Homrighous | Sept. 5, 1950 |
| 2,539,440 | Labin | Jan. 30, 1951 |
| 2,580,073 | Burton | Dec. 25, 1951 |